(12) United States Patent
Takamatsu et al.

(10) Patent No.: US 10,721,921 B2
(45) Date of Patent: Jul. 28, 2020

(54) SPINNING REEL

(71) Applicant: Shimano Inc., Sakai, Osaka (JP)

(72) Inventors: Takuji Takamatsu, Sakai (JP); Kei Saito, Sakai (JP); Satoshi Ikebukuro, Sakai (JP); Tomoya Deguchi, Sakai (JP)

(73) Assignee: SHIMANO INC., Sakai, Osaka (JP)

( * ) Notice: Subject to any disclaimer, the term of this patent is extended or adjusted under 35 U.S.C. 154(b) by 115 days.

(21) Appl. No.: 16/150,603

(22) Filed: Oct. 3, 2018

(65) Prior Publication Data

US 2019/0124903 A1    May 2, 2019

(30) Foreign Application Priority Data

Oct. 30, 2017  (JP) .................................. 2017-208773

(51) Int. Cl.
*A01K 89/01*        (2006.01)
(52) U.S. Cl.
CPC .............................. *A01K 89/01121* (2015.05)
(58) Field of Classification Search
CPC ............................................... A01K 89/01121
See application file for complete search history.

(56) References Cited

U.S. PATENT DOCUMENTS

| 5,318,243 | A  | * | 6/1994  | Hitomi    | A01K 89/0117 |
|-----------|----|---|---------|-----------|--------------|
|           |    |   |         |           | 242/248      |
| 2004/0227028 | A1 | * | 11/2004 | Nishikawa | A01K 89/01   |
|           |    |   |         |           | 242/249      |
| 2008/0149750 | A1 | * | 6/2008  | Kitajima  | A01K 89/01   |
|           |    |   |         |           | 242/224      |
| 2008/0173743 | A1 | * | 7/2008  | Saito     | A01K 89/006  |
|           |    |   |         |           | 242/227      |
| 2015/0201598 | A1 | * | 7/2015  | Hiraoka   | A01K 89/0192 |
|           |    |   |         |           | 242/322      |
| 2017/0064934 | A1 | * | 3/2017  | Lee       | A01K 89/0184 |

FOREIGN PATENT DOCUMENTS

EP         3311662 A1 *  4/2018   ....... A01K 89/01127
JP         2015-136338 A   7/2015

* cited by examiner

*Primary Examiner* — Emmanuel M Marcelo
(74) *Attorney, Agent, or Firm* — United IP Counselors, LLC

(57) ABSTRACT

A spinning reel for casting a fishing line forward includes a reel main body and a lid. The reel main body has an accommodating portion including an accommodating space, an opening located in a side of the accommodating portion, and a cylindrical portion disposed in front of the accommodating portion. The lid has a lid main body for sealing the opening, and a projection projecting forward from the lid main body. The projection overlaps with the cylindrical portion in a side view.

12 Claims, 6 Drawing Sheets

FRONT ←――――――――→ REAR

FRONT ← → REAR

SPINNING REEL

CROSS-REFERENCE TO RELATED APPLICATIONS

This application claims priority to Japanese Patent Application No. 2017-208773, filed Oct. 30, 2017. The contents of that application are herein incorporated by reference in their entirety.

BACKGROUND

Technical Field

The present disclosure relates to a spinning reel.

Background Information

A spinning reel includes a reel main body, a rotor, a spool, and a handle. Rotating the handle causes the rotor to rotate, winding a fishing line on the spool.

The reel main body has a reel main body and a lid. The reel main body has an accommodating space therein for accommodating a drive mechanism, an oscillating mechanism, and the like. The reel main body also has an opening in a side surface thereof. This opening is sealed by the lid. The reel main body has a cylindrical portion in a front part thereof. A one-way clutch and the like are mounted on this cylindrical portion.

BRIEF SUMMARY

As shown in FIG. 6, in a spinning reel having the foregoing configuration, a groove 40 formed at the boundary between a cylindrical portion 230 and a lid 30 extends linearly in a direction substantially parallel to the direction of winding the fishing line, that is, the circumferential direction of the cylindrical portion 230. Therefore, without a flange, the fishing line is likely to fall into the groove 40 located at this boundary. An object of the present disclosure, therefore, is to prevent the fishing line from falling into the groove at the boundary between the cylindrical portion and the lid.

A spinning reel according to one aspect of the present disclosure is configured to cast a fishing line forwardly. This spinning reel has a reel main body and a lid. The reel main body has an accommodating portion including an accommodating space, an opening in a side of the accommodating portion, and a cylindrical portion disposed in front of the accommodating portion. The lid has a lid main body for sealing the opening, and a projection projecting forward from the lid main body. The projection overlaps with the cylindrical portion in a side view.

According to this configuration, since the projection overlaps with the cylindrical portion in a side view, the projection extends to cross a groove extending linearly in the direction of winding the fishing line. Therefore, the fishing line can be prevented from falling into the groove.

It is preferred that the cylindrical portion have a recess formed on an outer peripheral surface thereof. It is also preferred that the projection be accommodated in this recess.

It is preferred that an outer surface of the projection be flush with the outer peripheral surface of the cylindrical portion.

It is preferred that the outer surface of the projection be on the same plane as an outer surface of the lid main body.

It is preferred that the lid further have a wall extending from an inner surface of a boundary between the projection and the lid main body. It is also preferred that the cylindrical portion have a bottom portion facing the wall.

According to the present disclosure, the fishing line can be prevented from falling into the groove at the boundary between the cylindrical portion and the lid.

DETAILED DESCRIPTION OF EMBODIMENTS

Figure 1:
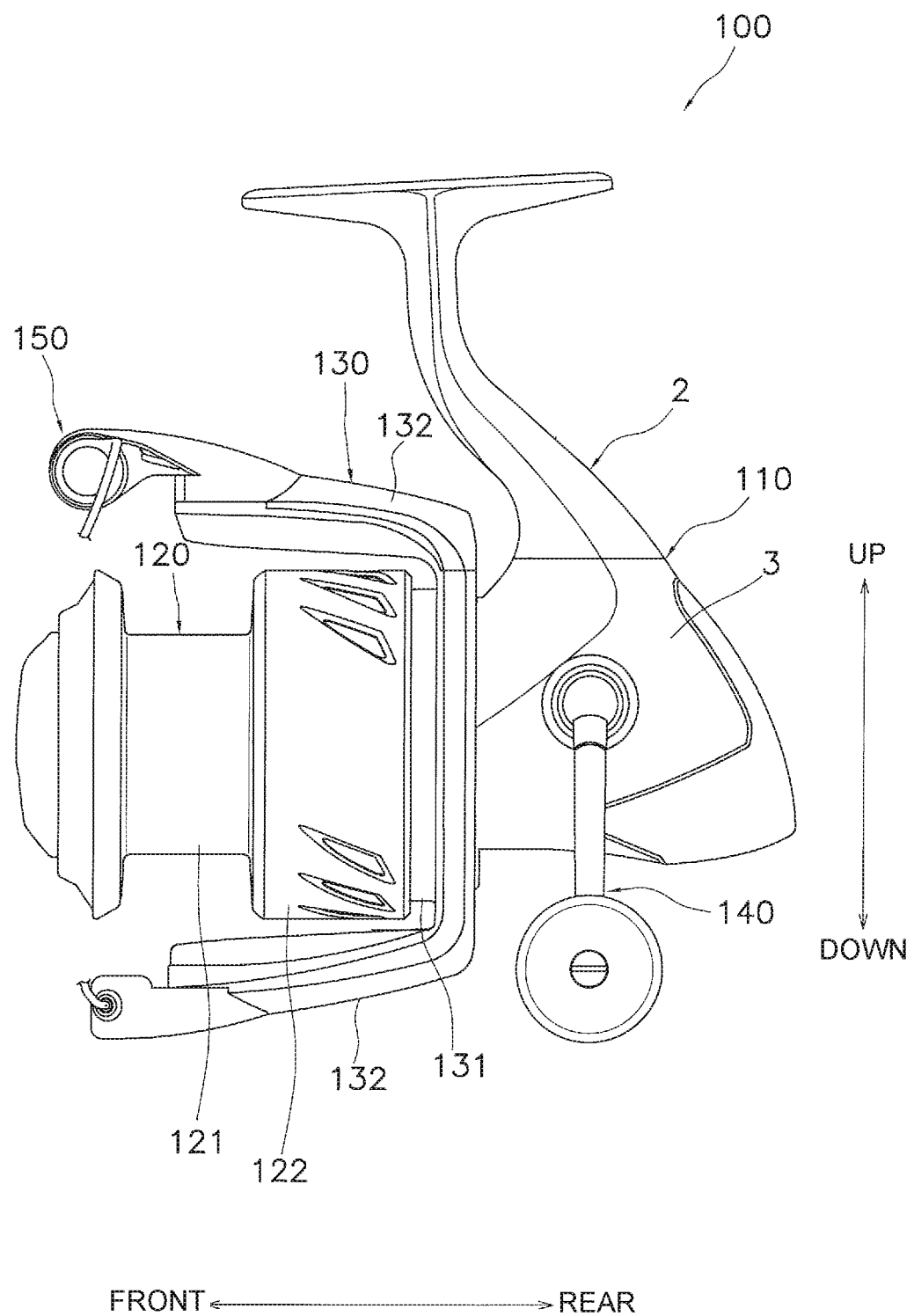
FIG. 1 is a side view of a spinning reel.

Embodiments of a spinning reel according to the present disclosure are now described hereinafter with reference to the drawings. FIG. 1 is a side view of a spinning reel 100. Note that, in the present specification, the direction in which a fishing line is pulled out is referred to as "front" and a direction in which the fishing line is wound as "rear." In addition, with the spinning reel 100 mounted on a fishing rod, the direction toward the fishing rod is referred to as "upper" and the direction away from the fishing rod as "lower."

[Overall Configuration]

As shown in FIG. 1, the spinning reel 100 includes a reel main body 110, a spool 120, a rotor 130, a handle 140, and a fishing line guide mechanism 150. The spinning reel 100 is configured to cast the fishing line forward.

[Overview of Reel Main Body]

The reel main body 110 has an accommodating space therein for accommodating a variety of mechanisms. For example, a rotor drive mechanism (not shown) for rotating the rotor 130, an oscillating mechanism (not shown) for moving the spool 120 back and forth, and the like are accommodated in the reel main body 110. The reel main body 110 is described hereinafter in more detail.

[Spool]

The spool 120 is a member on which the fishing line is wound. The spool 120 is in a substantially cylindrical shape. Rotating the handle 140 causes the spool 120 to reciprocate in a front-rear direction. The spool 120 has a bobbin cylinder 121 and a skirt 122. The bobbin cylinder 121 is in a cylindrical shape, wherein the fishing line is wound on an outer peripheral surface thereof. The skirt 122 is in a cylindrical shape and has a diameter larger than that of the bobbin cylinder 121.

[Rotor and Fishing Line Guide Mechanism]

The rotor 130 is a member for winding the fishing line on the spool 120. The fishing line guide mechanism 150 is a mechanism for guiding the fishing line to the spool 120. Rotating the handle 140 causes the rotor 130 to rotate about a central axis of the spool 120. Then, the fishing line guide mechanism 150 rotating together with the rotor 130 guides the fishing line to the spool 120.

The rotor 130 has a rotor main body 131 and a pair of rotor arms 132. The rotor main body 131 is in a cylindrical shape. The rotor main body 131, except for a rear end thereof, is disposed inside the skirt 122.

The pair of rotor arms 132 extends forward from an outer peripheral surface of the rotor main body 131. The rotor arms 132 are arranged at positions opposite to each other in a peripheral direction of the rotor main body 131. The fishing line guide mechanism 150 is attached to the pair of rotor arms 132 so as to be able to swing.

[Details of Reel Main Body]

The reel main body 110 has a reel main body 2 and a lid 3. The handle 140 is rotatably attached to the reel main body 110. Furthermore, the reel main body 110 is mounted onto the fishing rod.

[Reel Main Body]

Figure 2:
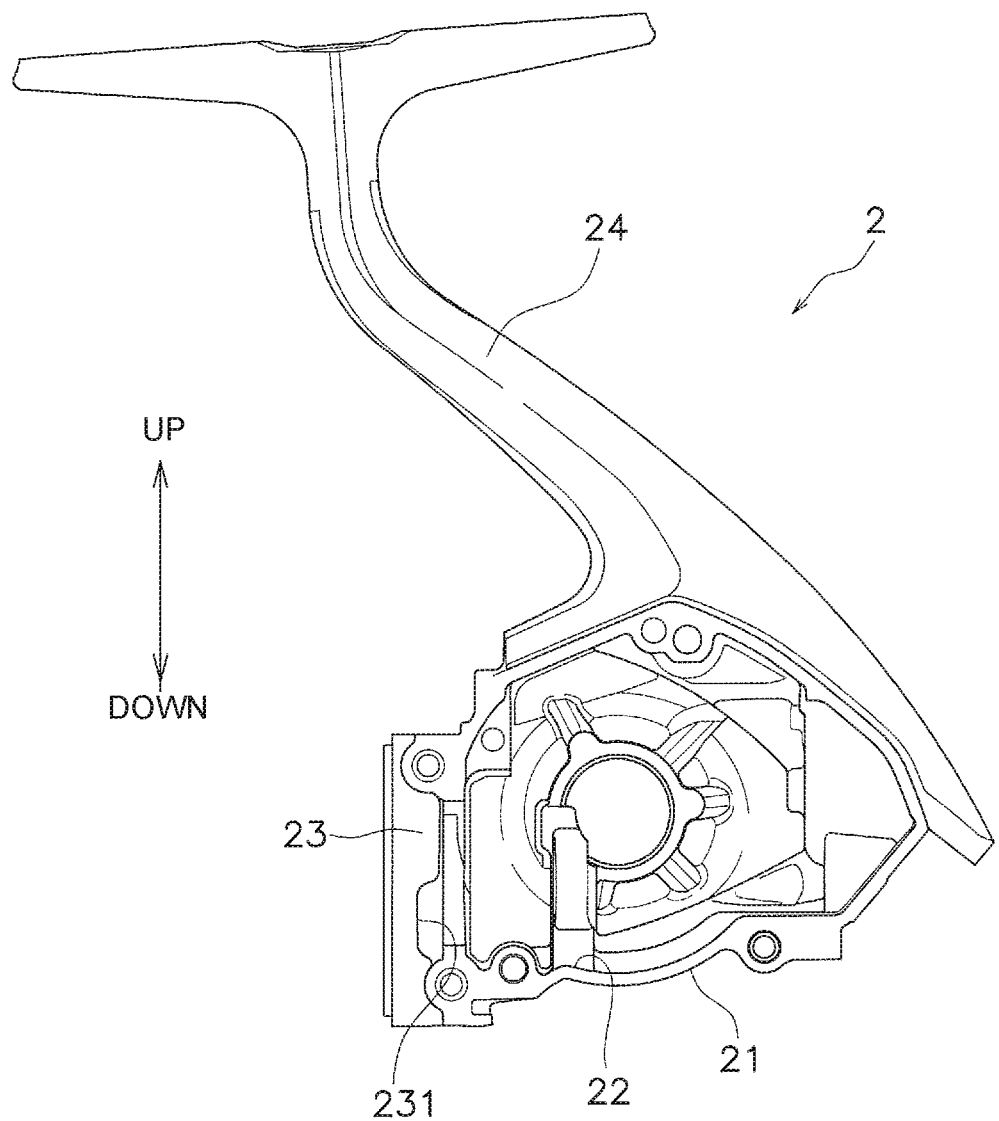
FIG. 2 is a side view of a reel main body.

As shown in FIG. 2, the reel main body 2 has an accommodating portion 21, an opening 22, a cylindrical portion 23, and an attachment leg 24. The accommodating portion 21, the cylindrical portion 23, and the attachment leg 24 are configured by a single member.

The accommodating portion 21 has an accommodating space therein. The foregoing rotor drive mechanism and oscillating mechanism and the like are accommodated in the accommodating space of the accommodating portion 21. The attachment leg 24 extends upward from the accommodating portion 21. The attachment leg 24 is configured to be mounted onto the fishing rod.

The opening 22 is formed in a side surface of the accommodating portion 21. The opening 22 opens the accommodating space to the external space. The opening 22 is formed over the entire side surface of the accommodating portion 21.

The cylindrical portion 23 is disposed in front of the accommodating portion 21. The cylindrical portion 23 is in the shape of a cylinder. The cylindrical portion 23 is disposed inside the rotor main body 131 of the rotor 130.

The cylindrical portion 23 has a recess 231 formed on an outer peripheral surface thereof. The recess 231 is formed on the outer peripheral surface of the cylindrical portion 23 at the side where the opening 22 is formed. The recess 231 is opened rearward.

A lower end surface of the cylindrical portion 23 is located lower than a lower end surface of the accommodating portion 21. Furthermore, in the reel main body 2, the lower end surface of the cylindrical portion 23 is located at the lowermost part. A disc-shaped flange is not formed between the cylindrical portion 23 and the accommodating portion 21.

[Lid]

Figure 3:
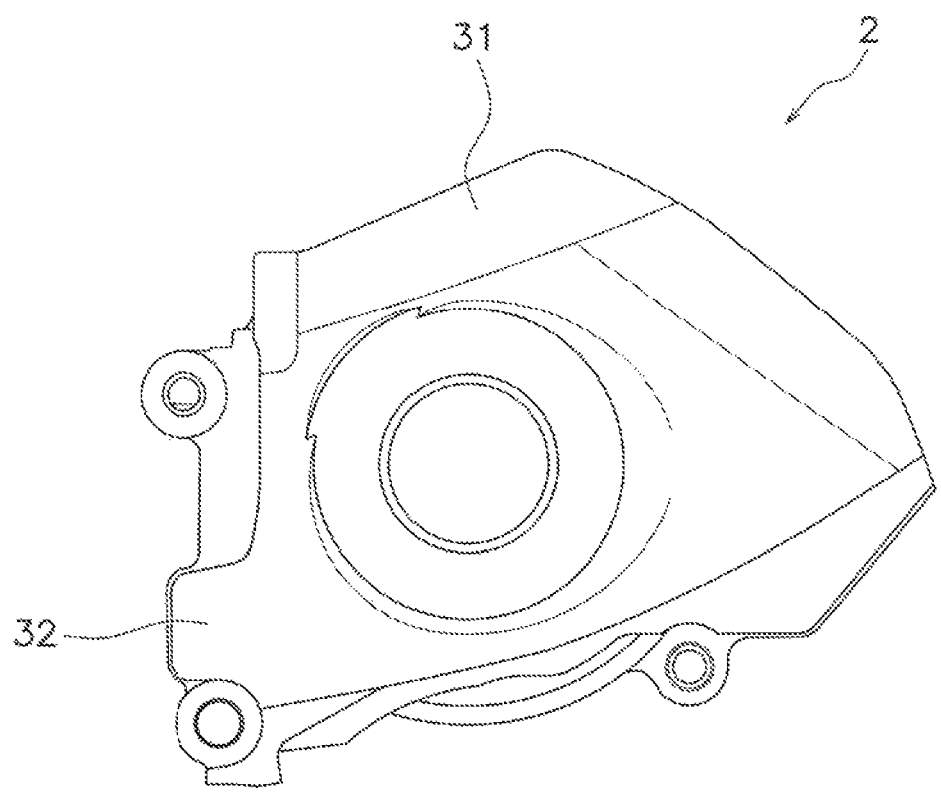
FIG. 3 is side view of a lid.

As shown in FIG. 1, the lid 3 is configured to seal the opening 22 of the reel main body 2. As shown in FIG. 3, the lid 3 has a lid main body 31 and a projection 32. Note that the lid 3 is not provided with a disc-shaped flange that fills the gap between the lid 3 and the rotor main body 131.

The lid main body 31 seals the opening 22. The lid main body 31 is shaped to be slightly larger than the opening 22. The lid main body 31 is fixed to the reel main body 2 by, for example, a bolt or the like.

Figure 4:
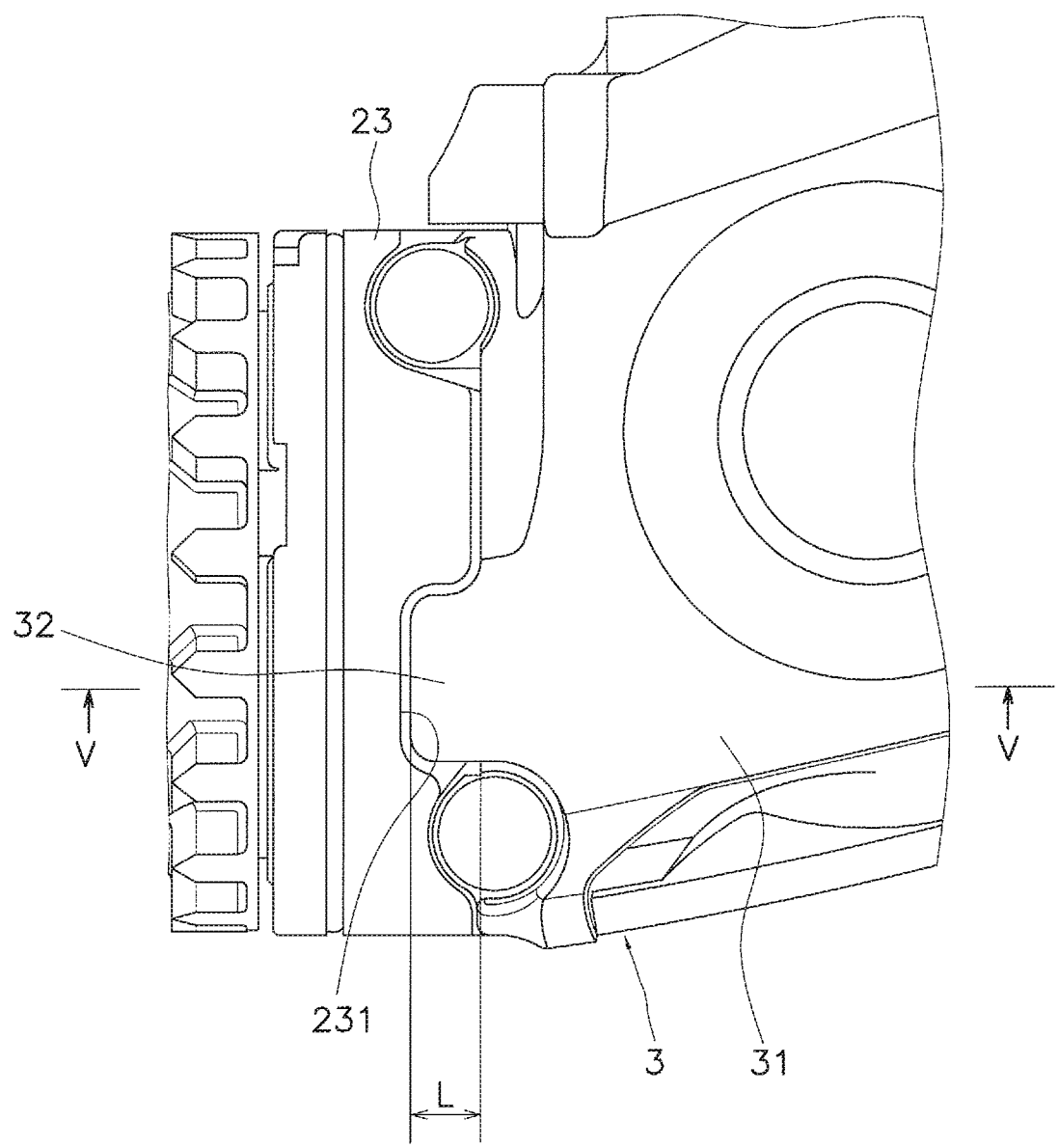
FIG. 4 is an enlarged side view of a reel main body.

The projection 32 projects forward from the lid main body 31. As shown in FIG. 4, the projection 32 overlaps with the cylindrical portion 23 in a side view. The length L at which the projection 32 overlaps with the cylindrical portion 23 is approximately 2 to 3 mm in the front-rear direction. The projection 32 is accommodated in the recess 231 of the cylindrical portion 23. The projection 32 and the recess 231 are each in, for example, a rectangular shape in a side view.

According to this configuration, since the projection 32 overlaps with the cylindrical portion in a side view, the projection 32 extends to cross a groove extending linearly in the direction of winding the fishing line. Therefore, the fishing line can be prevented from falling into the groove. Accordingly, the projection 32 is an example of a means for preventing the fishing line from falling into a groove.

Figure 5:
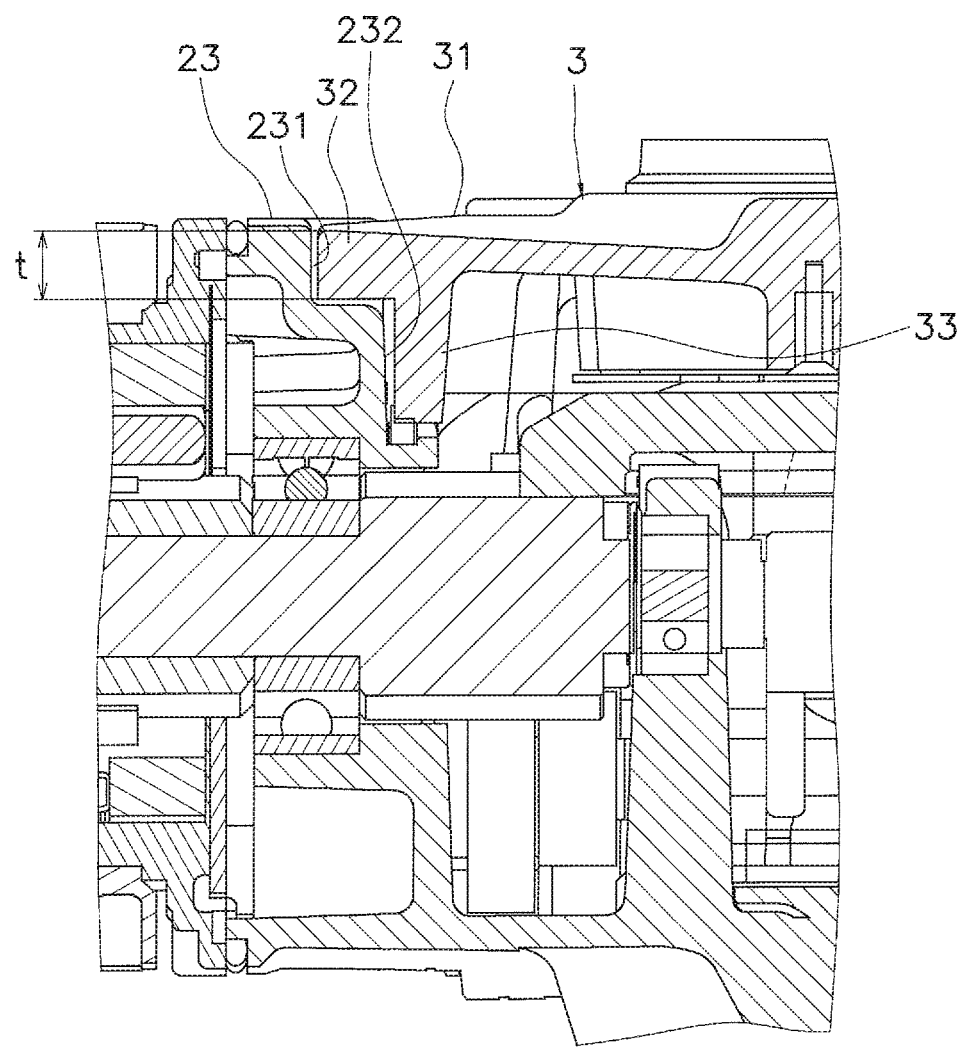
FIG. 5 is a cross-sectional view taken along line V-V of FIG. 4.
Figure 6:
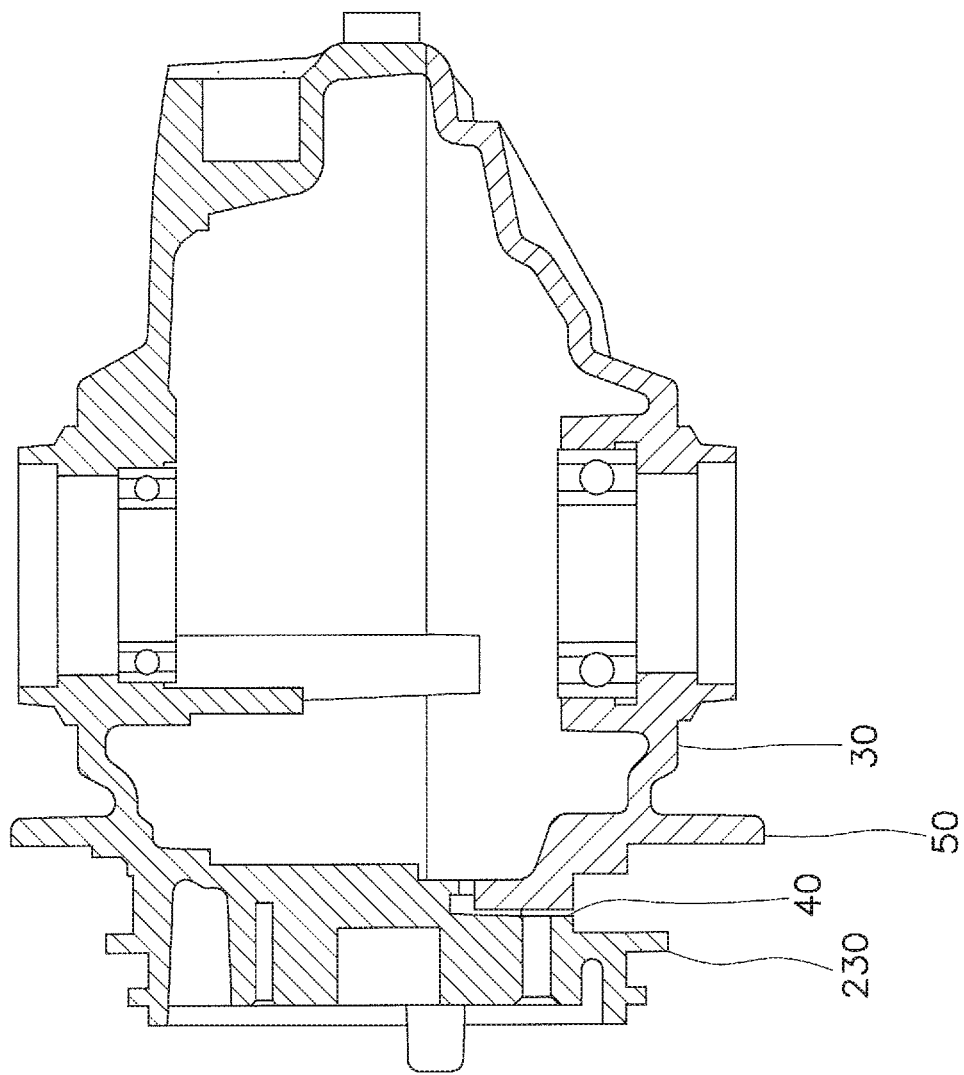
FIG. 6 is a cross-sectional view of the reel main body according to the background information.

As shown in FIG. 5, an outer surface of the projection 32 is flush with the outer peripheral surface of the cylindrical portion 23. Note that the outer surface of the projection 32 and the outer peripheral surface of the cylindrical portion 23 do not have to be perfectly flush with each other. For example, a step of approximately 0.5 to 1 mm can be formed between the outer surface of the projection 32 and the outer peripheral surface of the cylindrical portion 23. Note that the projection 32 has a thickness t of, for example, approximately 2.5 to 3.5 mm.

The outer surface of the projection 32 is on the same plane as an outer surface of the lid main body 31. In other words, no step is formed between the projection 32 and the lid main body 31. The projection 32 and the lid main body 31 are smoothly connected to each other. Therefore, the lid 3 is not provided with the disc-shaped flange that fills the gap between the lid 3 and the rotor main body 131. Note that the lid 3 can have the disc-shaped flange.

The lid 3 further has a wall 33 that extends from an inner surface of the boundary between the projection 32 and the lid main body 31. The cylindrical portion 23 has a bottom portion 232 facing the wall 33.

[Modifications]

Embodiments of the present disclosure have been described above, but the present disclosure is not limited thereto, and various modifications can be made without departing from the gist of the present advancement.

Modification 1

In the foregoing embodiments, the lid 3 has one projection 32. However, the lid 3 can have a plurality of projections 32.

Modification 2

In the foregoing embodiments, the projection 32 of the lid 3 is accommodated in the recess 231. However, the configuration of the projection 32 is not limited to this configuration. For example, the cylindrical portion 23 does not have to be provided with the recess 231. In such a case, the projection 32 is disposed to cover a portion of the outer peripheral surface of the cylindrical portion 23.

EXPLANATION OF REFERENCE NUMERALS

100 Spinning reel
2 Reel main body
21 Accommodating portion
22 Opening
23 Cylindrical portion
231 Recess
3 Lid
31 Lid main body
32 Projection

What is claimed is:

1. A spinning reel for casting a fishing line forward, comprising:
   a reel main body that has an accommodating portion including an accommodating space, an opening located in a side of the accommodating portion, and a cylindrical portion disposed in front of the accommodating portion; and
   a lid that has a lid main body for sealing the opening, and a projection projecting forward from the lid main body, the projection overlapping with the cylindrical portion in a side view and being configured to prevent the fishing line from falling into a groove.

2. The spinning reel according to claim 1, wherein
   the cylindrical portion has a recess on an outer peripheral surface of the cylindrical portion, and
   the projection is accommodated in the recess.

3. The spinning reel according to claim 2, wherein
an outer surface of the projection is flush with the outer peripheral surface of the cylindrical portion.

4. The spinning reel according to claim 3, wherein
the outer surface of the projection is on the same plane as an outer surface of the lid main body.

5. The spinning reel according to claim 1, wherein
the lid further has a wall extending from an inner surface of a boundary between the projection and the lid main body, and
the cylindrical portion has a bottom portion facing the wall.

6. The spinning reel according to claim 1, wherein the accommodating space accommodates a rotor drive mechanism or an oscillating mechanism.

7. A reel main body, comprising:
an accommodating portion including an accommodating space;
an opening located in a side of the accommodating portion;
a cylindrical portion disposed in front of the accommodating portion; and
a lid that has
a lid main body for sealing the opening, and
a projection projecting forward from the lid main body,
the projection overlapping with the cylindrical portion in a side view and being configured to prevent a fishing line from falling into a groove.

8. The reel main body according to claim 7, wherein
the cylindrical portion has a recess on an outer peripheral surface of the cylindrical portion, and
the projection is accommodated in the recess.

9. The reel main body according to claim 8, wherein
an outer surface of the projection is flush with the outer peripheral surface of the cylindrical portion.

10. The reel main body according to claim 9, wherein
the outer surface of the projection is on the same plane as an outer surface of the lid main body.

11. The reel main body according to claim 7, wherein
the lid further has a wall extending from an inner surface of a boundary between the projection and the lid main body, and
the cylindrical portion has a bottom portion facing the wall.

12. The reel main body according to claim 7, wherein the accommodating space accommodates a rotor drive mechanism or an oscillating mechanism.

* * * * *